(12) United States Patent
Dull et al.

(10) Patent No.: US 7,870,018 B2
(45) Date of Patent: Jan. 11, 2011

(54) BRAND VALUE MANAGEMENT

(75) Inventors: Stephen Dull, Coral Gables, FL (US); Susan A. Piotroski, Wellesley, MA (US)

(73) Assignee: Accenture Global Services GmbH, Schaffhausen (CH)

( * ) Notice: Subject to any disclaimer, the term of this patent is extended or adjusted under 35 U.S.C. 154(b) by 1814 days.

(21) Appl. No.: 10/804,720

(22) Filed: Mar. 19, 2004

(65) Prior Publication Data
US 2005/0209909 A1 Sep. 22, 2005

(51) Int. Cl.
*G06F 17/30* (2006.01)
*G07G 1/00* (2006.01)
(52) U.S. Cl. ........................................... 705/10
(58) Field of Classification Search .............. None
See application file for complete search history.

(56) References Cited

U.S. PATENT DOCUMENTS

| | | |
|---|---|---|
| 2001/0041995 A1 | 11/2001 | Eder |
| 2002/0032585 A1 | 3/2002 | Keyes |
| 2002/0122078 A1 | 9/2002 | Markowski |
| 2002/0138383 A1 | 9/2002 | Rhee |
| 2004/0039676 A1 | 2/2004 | Trainer |
| 2004/0093296 A1* | 5/2004 | Phelan et al. ............ 705/36 |

FOREIGN PATENT DOCUMENTS

| EP | 1 288 813 A1 | 3/2003 |
|---|---|---|
| EP | 1 351 175 A | 10/2003 |

OTHER PUBLICATIONS

David Haigh, Understanding the Financial Value of Brands, Jun. 1999, Brand Finance, PLC, in conjnction with the European Association of Advertising Agencies.*
Debashis Pati, Marketing Research, 2002, Universities Press.*
Debashis Pati, Marketing Research, 2002, OrientLongman.*
"Brand Pyramid", Andrew Fletcher Consulting, Aug. 19, 2003, pp. 1-4.
"Measuring the Impact of Brand-Building Investments", Marketing Leadership Council, Apr. 2003, pp. 1-17, 19-53.
Office Action issued Feb. 29, 2008 by the EPO regarding summons to attend oral proceedings on Application No. 05729625.3-1527.

* cited by examiner

*Primary Examiner*—Romain Jeanty
*Assistant Examiner*—Brandi P Parker
(74) *Attorney, Agent, or Firm*—Finnegan, Henderson, Farabow, Garrett & Dunner, LLP

(57) ABSTRACT

A combination of several analytical computer-assisted modeling techniques may be used to evaluate the value of a brand, the relative value of competitive brands and may identify the opportunities to increase brand value and the priority of those opportunities. Image/Attitudinal driver analysis, pyramid analysis, probability analysis, trade-off analysis, and other regression techniques may be used in novel combinations to quantify brand development, impacts and the overall estimate of brand value. For example: (1) image driver analysis may be applied to each level of a brand pyramid to understand how to most effectively move customers through to the next level in the pyramid; (2) probability analysis may be used to estimate the impact of each movement through the pyramid; and (3) tradeoff analysis may be used to improve the value customers perceive at any particular level of the pyramid.

17 Claims, 8 Drawing Sheets

Image Pyramid

The Brand Cycle

The Brand Cycle for Brand X

Image Perceptual Map

Image Perceptual Map

Image Pyramid

BRAND VALUE MANAGEMENT

BACKGROUND OF THE INVENTION

This invention relates to marketing, and specifically to a method of combining several computer-based modeling techniques to evaluate the drivers of brand value, to quantify the impact of brand development activities, and to drive brand investment decisions that may optimize business performance and value creation.

Brand value management requires understanding how all interactions with customers—not just advertising or trademarked logos—contribute to customers' perception of the brand and as a result, have an impact on the company's brand value. Brand value management helps brand owners to answer some critical questions, such as:

What is driving the value of the brand?
How much of a premium price (if any) can the brand command?
How much does the brand affect customer choice?
Is it worth investing more in the brand?
Where should money be spent in order to maximize value?

Generally speaking, brand value management may have several goals. For example, it may seek to quantify the existing value of the brand based on its strengths and weaknesses. It may also work to optimize brand positioning against current/emerging market needs or preferences. Competitive positioning may be identified and managed as part of brand value management, and action plans may be developed. Brand value management may also include quantifying the benefits of various investments to increase the value of the brand.

Results of successful brand value management may include: increased market share, higher profitability, reduced customer churn, higher-value customer base, more cost-effective marketing, greater share of customer wallet, and the ability to generate new revenue streams, among others.

In the past, there have been focused brand analysis systems that use specific techniques to assess the factors that impact brand value. However, the Marketing Leadership Council (Washington D.C.) reports that "no single measurement approach successfully answers both why brand building is an investment worth senior management's attention and how marketers should allocate dollars across various brand-building investment options." Research supports this assertion. A recent study shows that nearly three quarters of marketing executives in the U.S. and U.K. believe their company cannot effectively measure campaign ROI. What is needed is a holistic, analytical system that can provide an answer to how marketing dollars should best be spread across various brand messages. What is also needed is a method is a way to quantify brand development opportunities or impacts using a combination of analytical techniques. What is also needed is a method to understand the impact of customers moving up through a brand pyramid's tiers. Another need in the art is a way to link brand drivers to pricing. Yet another need is a method to develop brand pyramids that are optimized for particular brands or industries. Brand pyramid archetypes are needed to understand general brand relationships for a type of brand, for a geographic area, for an industry, or other characteristic.

BRIEF SUMMARY OF THE INVENTION

A combination of analytical techniques may be used to generate new insights into the extent to which various factors affecting brand experience have an impact on the image of the brand and on customer's behavior. This added intelligence allows a company to make better decisions about the business capabilities to invest in that will increase brand value and maximize profits. Image/equity analysis, customized brand pyramid analysis, brand pyramid conversion analysis, trade-off analysis, econometric analysis, behavioral analysis, probability analysis, and pyramid clustering techniques may be used in combination and synthesized to quantify and guide brand development decisions. Combining and synthesizing these analysis techniques may be used to: build a tailored brand pyramid having a specialized number of tiers and specialized tier definitions; analyze how efficiently and effectively customers move (i.e., "convert") through each level of the brand pyramid; calculate probabilities of success of affecting specific variables to drive customers through the pyramid; prioritize and quantify development opportunities; and determine the relationships between brand drivers and increments in price.

Another aspect of this invention is to cluster multiple brand pyramids created for a given variable (e.g., geography, customer segment, industry, etc.). By analyzing the comparative likeness of the pyramids, they may be grouped into a series of archetype clusters based upon one or more common characteristics. The clustering allows discrete marketing strategies to be defined for each archetype.

DETAILED DESCRIPTION OF THE INVENTION

Figure 1:
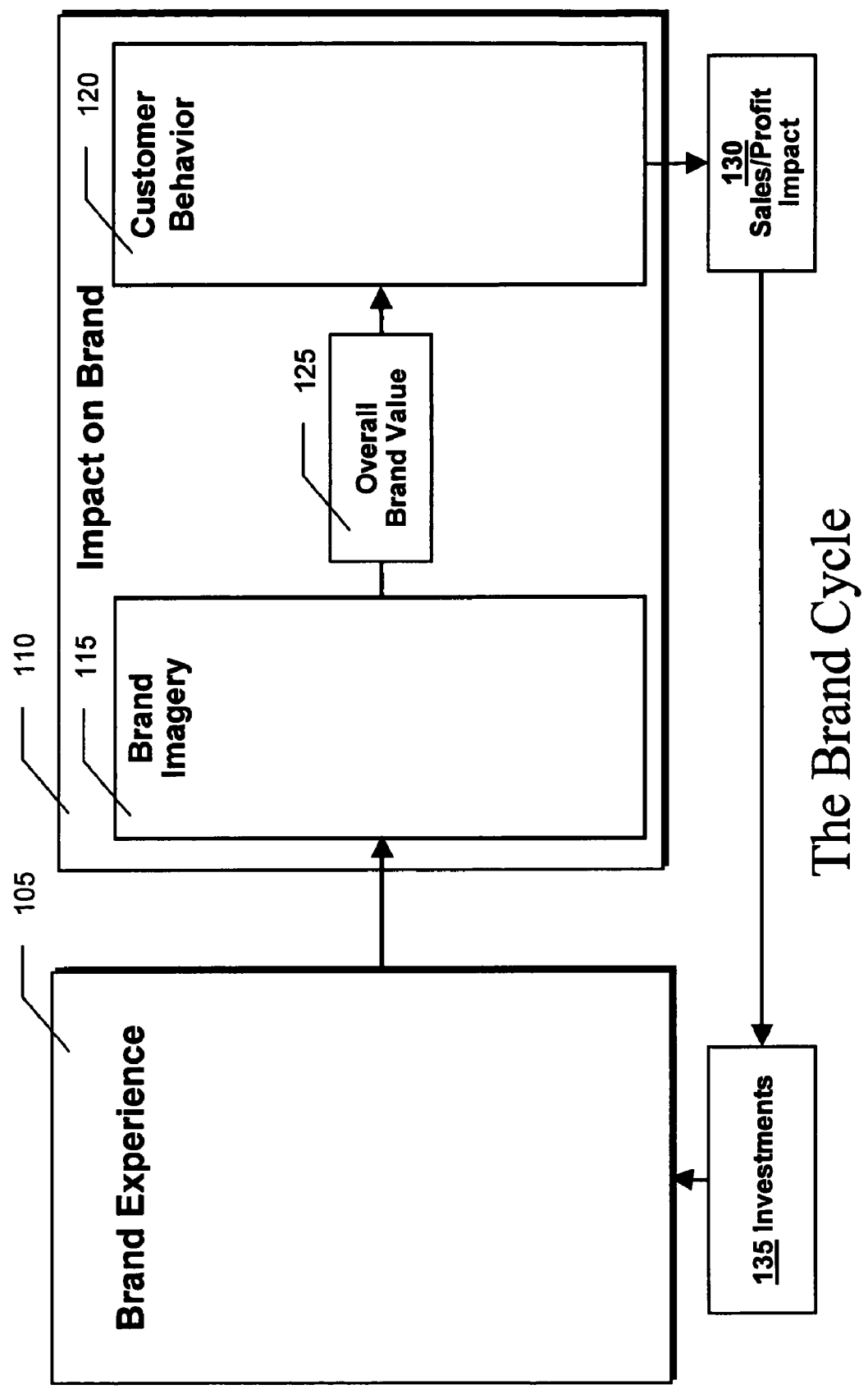
FIG. 1 is a diagram showing the cyclical changes to and impacts of a brand.

There are several ways to conceptualize a brand, its relationship in the market, and its dependence on customer opinion. FIG. 1 is a diagram showing one such conceptualization, referred to as "The Brand Cycle." As the figure demonstrates, brand experiences 105 may have an impact on a brand 110. The impact may be the formulation of one or more images for the brand 115 by customers. These images may be positive, negative, or neutral. The totality of the brand's image may form the basis of its value 125. The behavior of customers may be affected by their perception of the brand 120. Customer behavior may then impact the company's sales and profit 130, which can then be funneled back into the marketing cycle as investments 135 to invest in capabilities that may further impact customers' experience with the brand. When speaking of the cycle shown in FIG. 1, a customer may be a consumer in a B2C transaction or a business in a B2B transaction.

Figure 2:
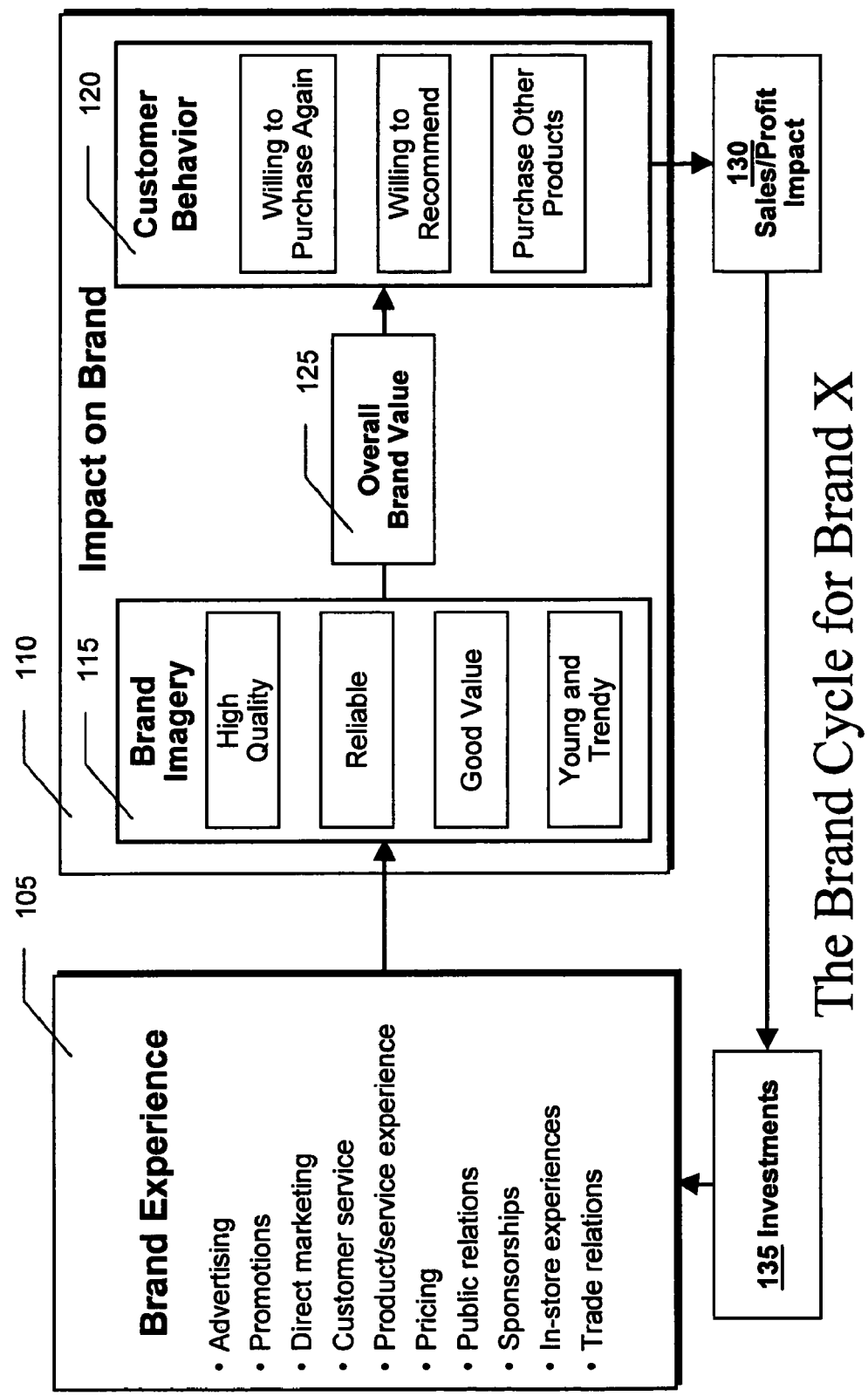
FIG. 2 is a diagram showing some of the possible factors driving the brand cycle.

While FIG. 1 shows the brand cycle generically, the actual factors driving the cycle may vary for different brands in different industries. FIG. 2 shows exemplary factors from one hypothetical brand (shown as "Brand X"). Here, customers' perceptions are shaped by their exposure and reaction to Brand X via ads, promotions, in-store displays, sponsorship of events, and the like. Customer surveys may reveal that based on these experiences, customers tend to hold an image that Brand X offers, for example high quality for good value or is trendy and reliable. These images may help to boost the brand's value. Conversely, if customers' images of a brand are that it is unreliable, outdated and of moderate value, then such images may work to diminish the brand's value.

Positive perceptions of brands may encourage positive customer behavior. Thus, in FIG. 2, the various images for Brand X result in customers being willing to buy the product again, recommend it to others, and to try other products marketed under the same brand. Because of the impact brand image may have on customer action, a company can benefit from understanding which factors have the greatest impact on creating a positive brand image. The large sums of money that are spent on marketing and other activities to build a brand's image make it even more important to understand the drivers of brand value and to quantify impact of brand development activities. Analytical techniques may be used to generate new insights into customers' perceptions, customers' behaviors and the "levers" that can be pulled to increase the perception and resulting profit/value/equity generated from a brand. One of the invention's goal is to guide brand investment decisions that will optimize business performance and value creation. Through the use of a combination of analysis techniques, the present invention may assist a person to understand the extent to which the various factors affecting brand experience have an impact on the image of the brand and on customers' behavior. This information may provide a person with insight on what actions are likely to improve the customer's perception of the brand.

The present invention may be used by a person (from an image consulting company, a marketing services provider, an internal marketing department, etc.) to apply analytical techniques to the framework of the brand cycle in order to guide brand management decisions. In one embodiment, the person may generally follow a multi-step process, which may consist of some or all of the steps shown in the flowchart of FIG. 3. In that flowchart, a person may leverage existing brand imagery data or collect such data 305 & 310. Imagery data may be used to analyze customers' perceptions of a brand 315. A brand pyramid may be created 320 and data may be applied to the various tiers of the pyramid 325.

The number of tiers and the definition of each tier may be customized for each brand and industry. While some tiers generally may be re-used for different customized brand pyramids, other tiers may be unique to a specific brand or industry. One tier that may be useful in various situations is "behavioral loyalty". Behavioral analysis may be used to evaluate data collected about customer behaviors (such as purchase frequency, purchase amount, purchase location, etc.) in order to identify those customers who exhibit a certain threshold of "behavioral loyalty" and who represent a profitable segment of customers.

After the data has been applied to the various tiers, if the data doesn't support an acceptable pyramid shape 330, then the pyramid may be refined 335. In prior systems, data was not always available to create certain tiers of the pyramid, preventing the creation of a customized brand pyramid. In the present invention, certain data may be used as a proxy to define remaining tiers needed to complete a customized brand pyramid. For example, information is not readily accessible that defines the customers who might have "considered [a] product". However one may use data on "unaided awareness" as a proxy for those people who would belong to the "considered product" tier.

A customized brand pyramid is useful because it more accurately reflects the purchasing, attitudinal, and marketing dynamics in the marketplace. Once an acceptable customized pyramid is developed, a conversion figure may be created which highlights how efficiently and effectively customers are moving up the pyramid tiers 340. Findings from the brand image/equity analysis and the brand pyramid may be the subject of a trade-off analysis 345. Econometric and probability analysis may be performed 350. Econometric analysis may be run to calculate the weighting associated with the factors causing the conversion from one tier to the next. Recommendations may be further tested using probability analysis. In other embodiments of the invention, the person may choose to apply only one or more of these steps, or may choose to proceed through the steps in a different order. The steps as shown in FIG. 3 will now be explained.

Figure 3:
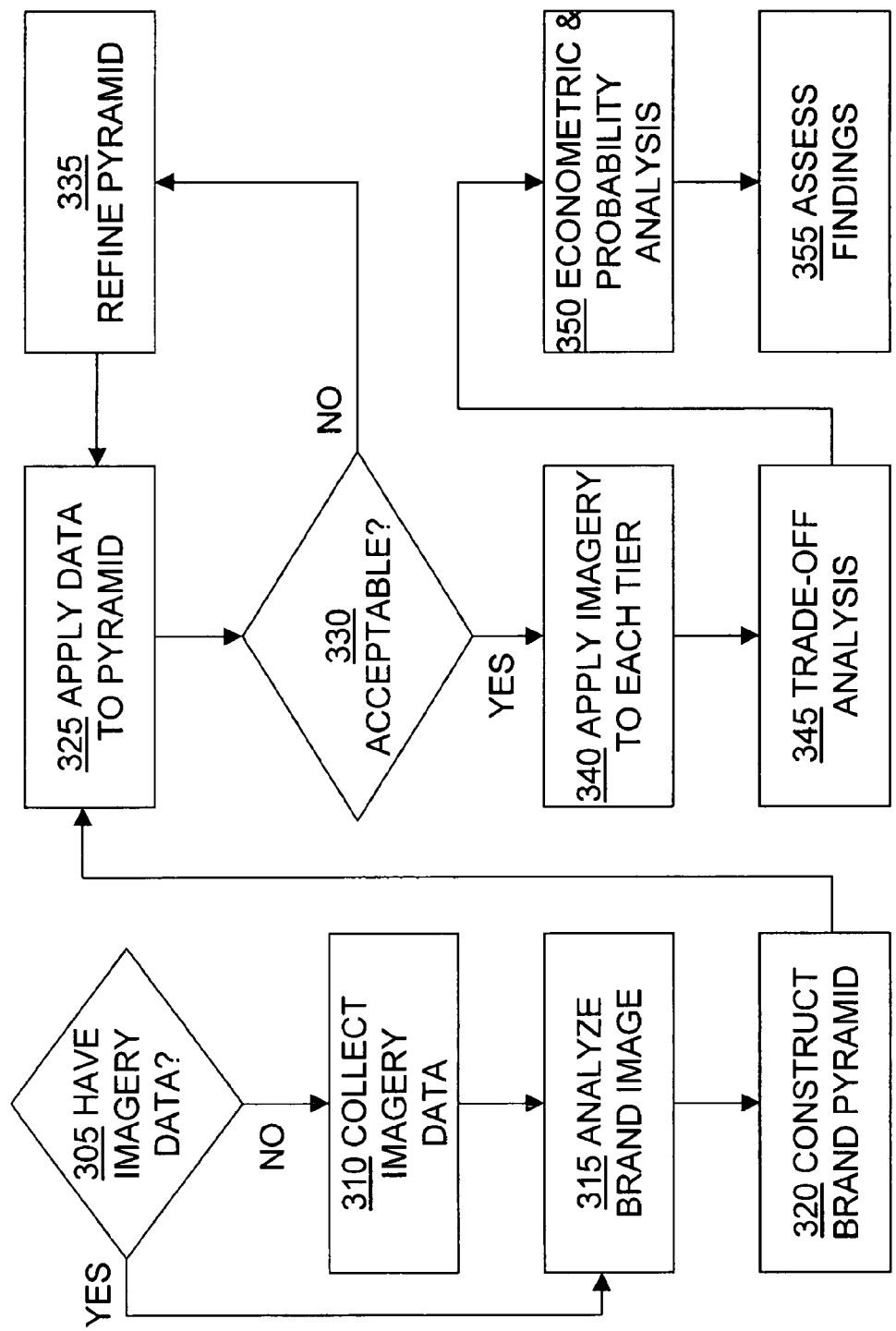
FIG. 3 is a flowchart of one embodiment of the present invention.

Brand Imagery Analysis (Steps 305-315 of FIG. 3)

In one embodiment of the invention, the person may perform brand imagery analysis to gain insight into the drivers of customers' opinions about a brand. This form of analysis may also be referred to as image/equity analysis since it identifies the components of equity in the brand that have financial meaning or relevance. For example, performing image/equity analysis on a "behavioral loyalty" tier of the customized pyramid, may be done to determine the drivers/factors affecting the behavior of such a profitable customer segment. To perform such image/equity analysis, one must possess market data about the brand and the competing brand(s) in question. In some situations, the brand owner may have gathered the market data already to be used for the analysis, either expressly or as a result of conducting one of several standardized surveys or attitudinal studies. In other situations, the data may not yet exist and so the person may form a hypothesis of the drivers of brand opinion and then conduct primary research to gather the data needed to conduct the analysis to validate or improve the hypothesis.

Once the person has possession of valid market data for the brand and the competing brand(s), the person may perform regression analysis, which is a statistical technique applied to data to determine the relative impact independent variables have on an end result. Since regression analysis measures how an outcome will be affected by changes in input conditions, the technique may be used to evaluate the effect on brand opinion based on customers' reactions to images of the brand and the competing brands. Such analysis may provide insight into the possible areas for investment to enhance the brand's image and value.

Figure 4:
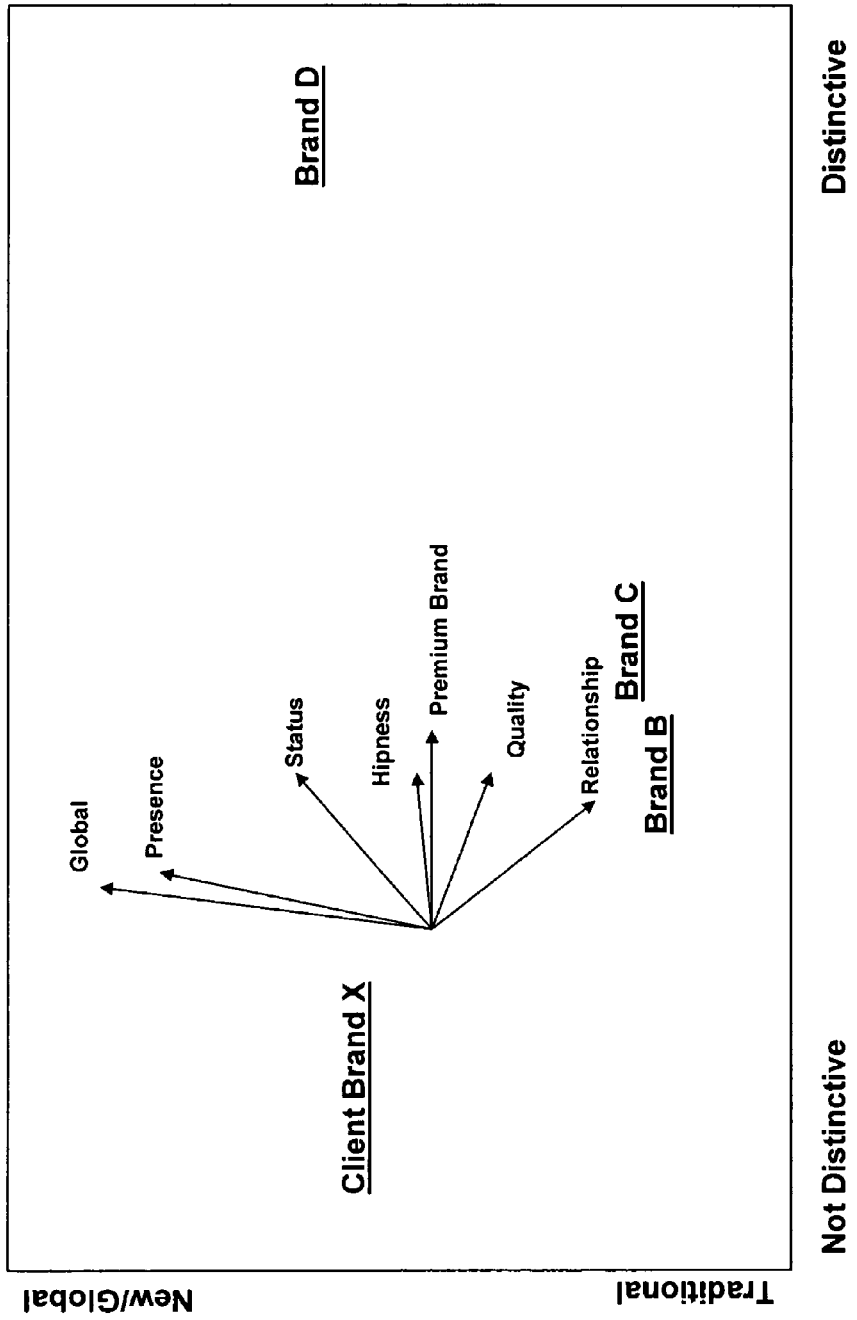
FIG. 4 is an image perceptual map showing imagery data in which client brand X is not differentiated from brands B and C.
Figure 5:
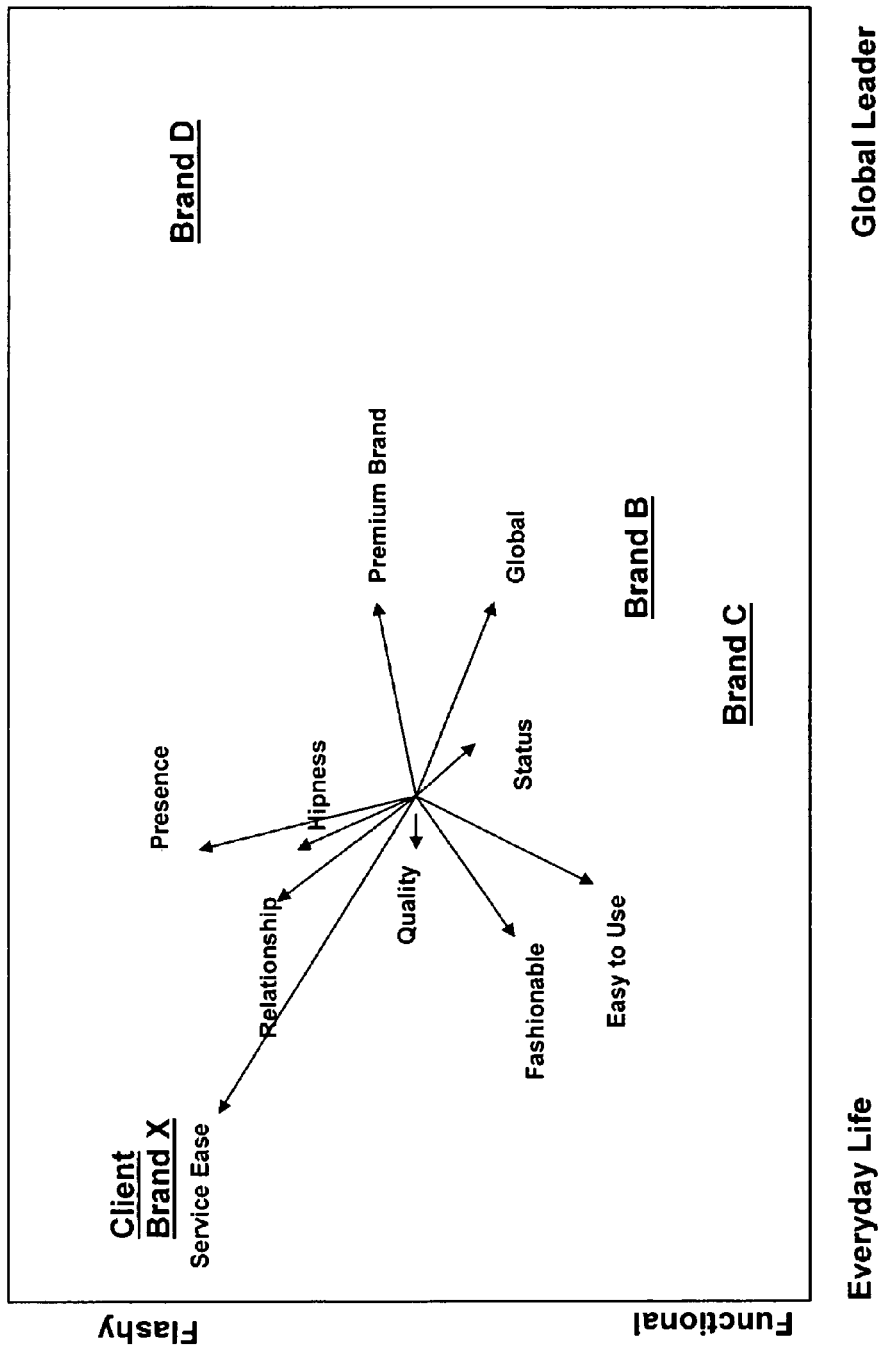
FIG. 5 is an image perceptual map showing imagery data in which client brand X is differentiated from brands B and C.

One deliverable from imagery analysis may be an image perceptual map, which shows how well differentiated a brand is and on what basis. FIGS. 4 and 5 illustrate two such maps, where the client's Brand X is compared to competing Brands B, C, and D. In FIG. 4, Brand X is undifferentiated, while in FIG. 5 it is highly differentiated, especially on 'service ease' and 'relationship' factors.

Brand Pyramid Analysis (Steps 320 to 330 of FIGS. 3)

Figure 6:
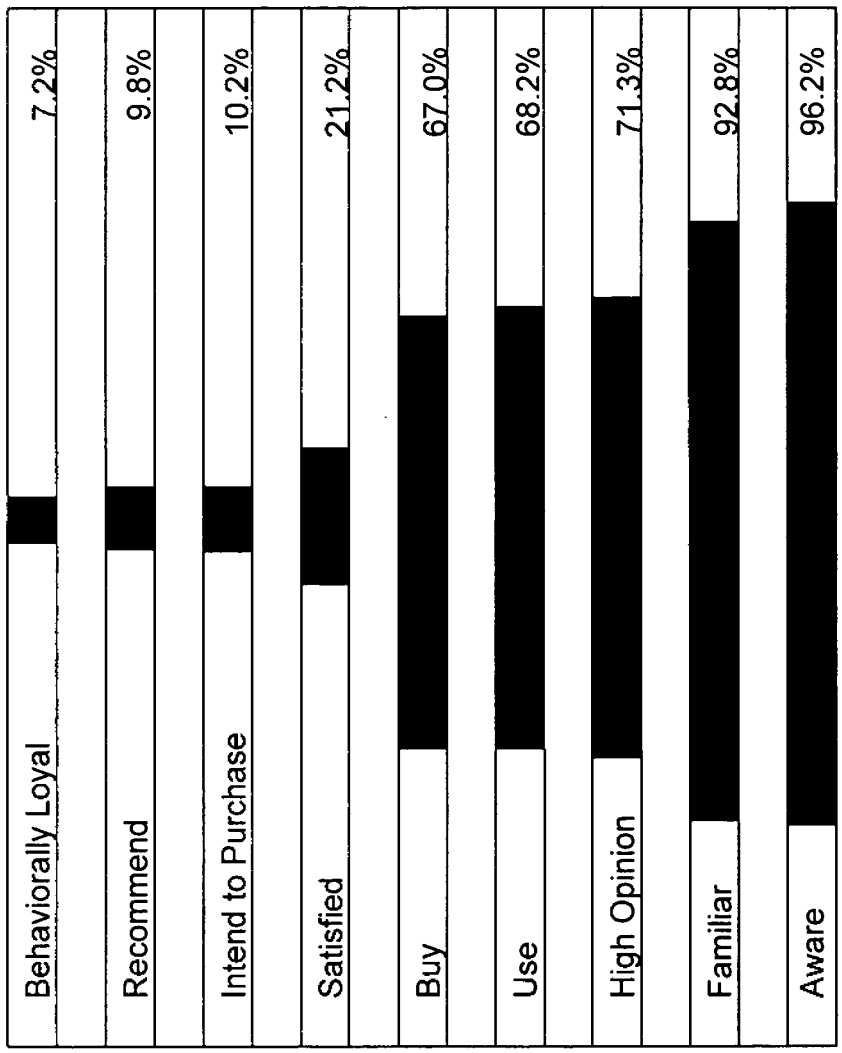
FIG. 6 is a diagram of an image pyramid.

The user may construct a brand pyramid to graphically illustrate customers' affinity with a brand (or brand's image) and how certain numbers of customers move along the spectrum of affinity from a lesser to a greater affinity with the brand. Such a brand pyramid is created as a series of tiers, where the goal is to have each of the tiers generally smaller than the tier below it. FIG. 6 is an example of a brand pyramid.

It shows a brand pyramid having nine tiers chosen to describe a customer's relationship with Brand X. The tier describing the lowest level of affinity (i.e., "aware") measures the percentage of people surveyed who were aware of Brand X's existence, which in this case is 96.2%. The next tier, indicating a somewhat stronger affinity, is "familiar" to show that 92.8% of respondents were not only aware of Brand X but were also familiar with the brand. The strongest affinity are the 7.2% of those surveyed who are behaviorally loyal to the brand. To build such a pyramid, the person may use an iterative technique of creating potential tiers and then populating the tiers based on the customer data to see if the tiers generally represent a pyramid. If not, the person may refine the tiers (by changing their labels or by changing the number of tiers) until the person is satisfied with the results.

Certain prior art systems also refer to brand pyramids or image pyramids. However, such systems either use the term 'brand pyramid' to represent a different concept, or such pyramids lack the novel features of the present invention. For example, one consulting firm uses a brand pyramid to describe brand meaning. That firm's pyramid consists of five levels, namely: Mark of Specification, Mark of Assurance, Moments of Choice, Mark of Association, and Emotional Involvement. A second prior art brand pyramid uses the tiers to represent questions about a brand. For example, the base level is known as "What are the tangible, verifiable, objective, measurable characteristics of the products, services, ingredients or components that carry this brand name?" Yet a third prior art brand pyramid is called the Brand Dynamics™ pyramid. The BrandDynamics™ pyramid has five tiers. The base tier is "Presence". The remaining four tiers are Relevance, Performance, Advantage, and Bonding.

Such prior art brand pyramids are static graphical methods for brand conceptualization. Users of these systems re-use the same pyramid concepts for each analysis project. In contrast, the present invention overcomes the inherent restrictions of such static, uncompromising pyramids. In the present invention, a personalized brand pyramid may be created, having a number of tiers and having each tier represent a feature, relationship, or other factor, as appropriate to the specific brand in question. Thus, while FIG. 6 shows a brand pyramid for Brand X where there are 9 tiers for such factors as "aware" and "familiar", a pyramid for Brand Y may contain, for example, 5 or 15 tiers as appropriate based upon the market data where each tier represents a factor chosen by the person.

Figure 7:
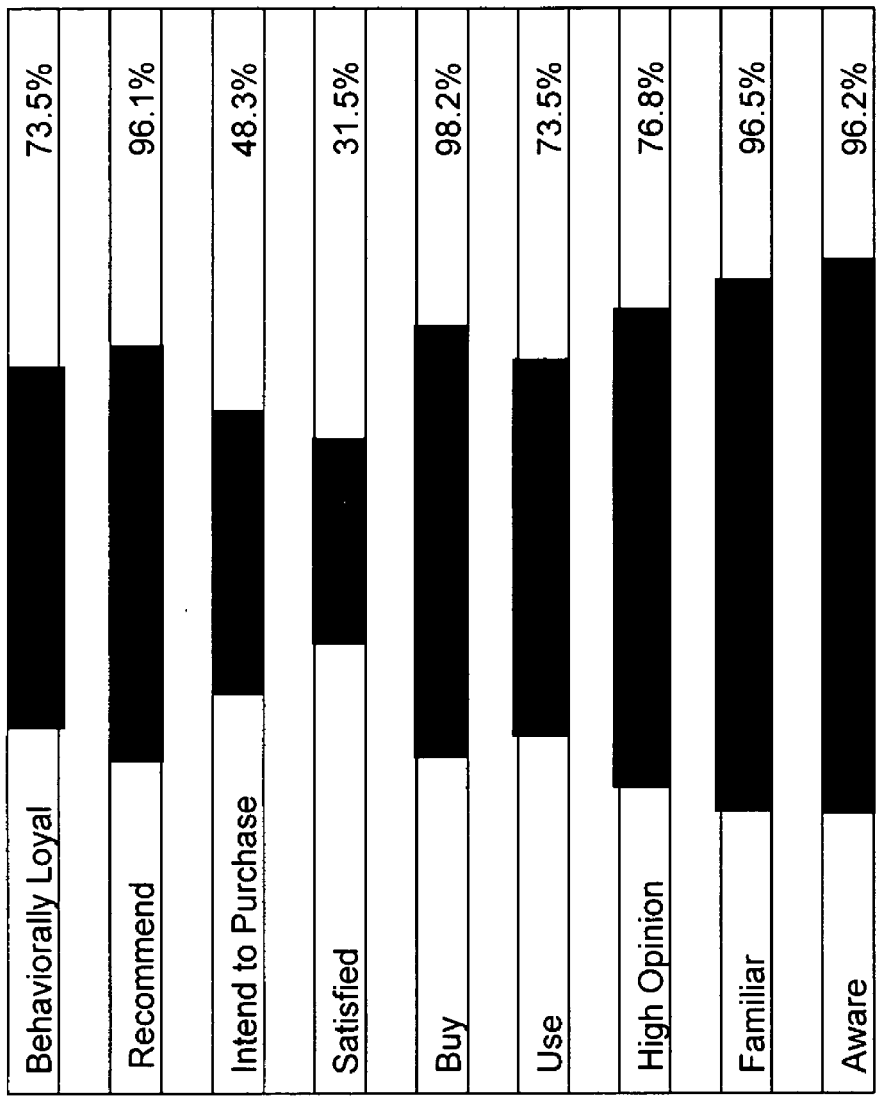
FIG. 7 is a diagram of a conversion pyramid corresponding to the image pyramid of FIG. 6.

Once the brand pyramid is created based on customer data, a conversion figure may also be created by analyzing the population of the various pyramid tiers. The conversion figure highlights the movement of customers up the pyramid tiers by displaying the percentage of conversion from the previous tier. FIG. 7 shows such a conversion graphic. Here, each tier represents the percentage of surveyed people who remain from the previous tier. In other words, FIG. 6 shows that 96.2% of the people are aware but only 92.8% are both aware and familiar. FIG. 7 shows that 96.2% of the people are aware, but that only 96.5% of this aware group is also familiar to Brand X. Thus, the tiers of FIG. 7 show the propensity/probability of a customer to convert/move along the spectrum of a customer's affinity with the brand. This representation of the data may be used to identify and pinpoint areas that are critical for marketing to improve the brand's perception, sales and/or profits. For example, FIG. 7 shows that there is a large drop in conversion from customers who "buy" versus those who "buy" and are also "satisfied." This indicates that focusing on satisfaction may be necessary and that any such investment has the potential of yielding a good return.

The conversion pyramid analysis may involve understanding why a certain group of customers bought a product while another group did not. A first step to determine this may be to find the brand images and the customer needs that caused the purchasing group to buy the product. The types of media associated with the brand image may also be tracked. For example, one may analyze whether certain print advertisements affected a conversion of a group of customers while banner ads did not.

Tier by Tier Analysis (Step 340 of FIG. 3)

Using the present invention, a person may perform a rigorous analysis of the brand pyramid by performing further image/equity analysis against each tier of the pyramid. The customers at each level of the pyramid may be identified. Then image/equity analysis may be performed against that customer subgroup to understand the specific factors that result in that subgroup having moved from the prior level to that level of the pyramid. This level-by-level approach may assist a person to understand what causes customers to move through the pyramid to the next level. Knowing this information can be insightful in how to further improve the brand's value/perception. For example, the person may begin by analyzing the "Aware" tier of the pyramid. To do this, the person may isolate the market data for the 96.2% of the customers who belong to the "Aware" tier. The person may then analyze the image factors from FIG. 5's image map to see which factor or factors drive a customer to belong to the "Aware" level. For example, this analysis may find that the "Service Ease" image factor may be a driving force at this particular level. The person may then move to the "Familiar" tier and isolate the 92.8% of customers who belong to this level. Synthesizing the image factors with data for this level's customers may help the person identify that the "Relationship" factor (for example) drives a person to move up the pyramid from "Aware" to "Familiar". After the "Familiar" level is analyzed, the person may move to the "High Opinion" level, and so forth up through the rest of the pyramid. The results of this synthesized analysis are primary image factors for each of the pyramid's tiers, which may show that different tiers are affected by different factors. In other words, such in-depth analysis may show that improving just one image factor may not be a panacea.

As part of this combination analysis, a person may ensure that only the appropriate customer data is used for each level. For example, in analyzing how a certain image factor relates to the lowest "Aware" tier of FIG. 6, only the data for the 96.2% of the customers surveyed would be included in the calculations. Then, when analyzing the "Familiar" tier, only the data for the 92.8% of the appropriate customers would be included. Such a tier-by-tier analysis, in which only data for each tier's customers is used, was not considered in any prior art system.

By using a combination of techniques, the person may be able to identify some of the most pressing needs hampering the brand's value, to explain gaps between client and competitor pyramids, to identify key opportunities for brand development, and/or to understand brand's position in the competitive landscape. For example, while prior art systems would, at most, apply image/equity analysis to the pyramid as a whole and present the client with a chart showing the progress of brand opinion, the present invention allows the person to pinpoint that the "Satisfied" and the "Intend to Purchase" groups should be focused on in order to improve the brand, for example. Furthermore, as previously mentioned, prior art systems would have applied any analysis to the static, pre-defined pyramid rather than to the present invention's brand-tailored pyramid.

Trade-Off Analysis (Step 345 of FIG. 3)

Once at least some of the pyramid levels are analyzed using image/equity analysis to determine the imagery drivers, the person may apply trade-off analysis (for example a conjoint analysis technique) to evaluate the trade-offs between trying to improve one factor over a second factor. In one embodiment, the person may combine customers' product feature ratings with a hypothetical product selection process in order to understand tradeoffs between focusing on the "Relationship" factor in the hopes of increasing membership to the "Buy" level versus focusing on the "Service Ease" factor in the hopes of increasing membership to the "Satisfied" level (for example). Such a trade-off analysis may assist the person in deciding which factors should be focused on in order to have the greatest overall influence the brand's value/perception.

Econometric Analysis and Probability Analysis to Understand Impact of Movement Through the Pyramid (Step 350 of FIG. 3)

Other types of analysis may be performed on the brand pyramid, such as regression analysis. One form of regression analysis is econometric analysis, such as econometrically-driven return-on-investment analysis. Through econometric regression analysis, the impact of different marketing activities on revenues or profits are identified. Those effects may be parsed out in order to describe the discrete effect of each lever affecting revenue or profits and to compare each lever against the cost of the lever. A return-on-investment then can be calculated for each lever.

A user may use econometric and/or probability analysis to calculate the cost/benefit of focusing on one or more factors. Time series, cross-sectional regression analysis may be used to identify the impact of marketing activities on revenue and profits. By parsing out the effect each marketing factor has on costs and profits, return-on-investment may be derived for each lever. Probability analysis may be used to calculate the probability that someone is going to convert or not convert from one tier to the next, based on a regression equation. For example, analysis may result in a finding that if quality goes up by a certain percent, then there is an average probability of converting the customers to the next tier of the pyramid. Such probability analysis may be powerful because it can reflect the distribution of data that one has collected about how customers feel, what they believe and how they will likely respond. In other words, the probability analysis may analyze real, observed, attitudinal data rather than simply analyzing sales or other historical data. Whereas image/equity analysis and tradeoff analysis (described above) produce an understanding of the factors and econometric analysis provides the coefficient amount, the probability analysis of this step may provide an understanding of a level of certainty for the effect of the factors.

In other embodiments, regression analysis may be performed to link image or other brand drivers to pricing power (i.e, the ability of a brand to raise its price). Such regression analysis on image driver data and a series of price increments (obtained from survey data or tradeoff analysis, for example) may allow a person to understand how to increase the power of the brand in order to enable a certain price increase. For example, the results of one hypothetical regression analysis activity may determine that if a company closes the gap between its branded product and a competitor's branded product by 7%, then a price increase of 1% is justifiable.

Figure 8:
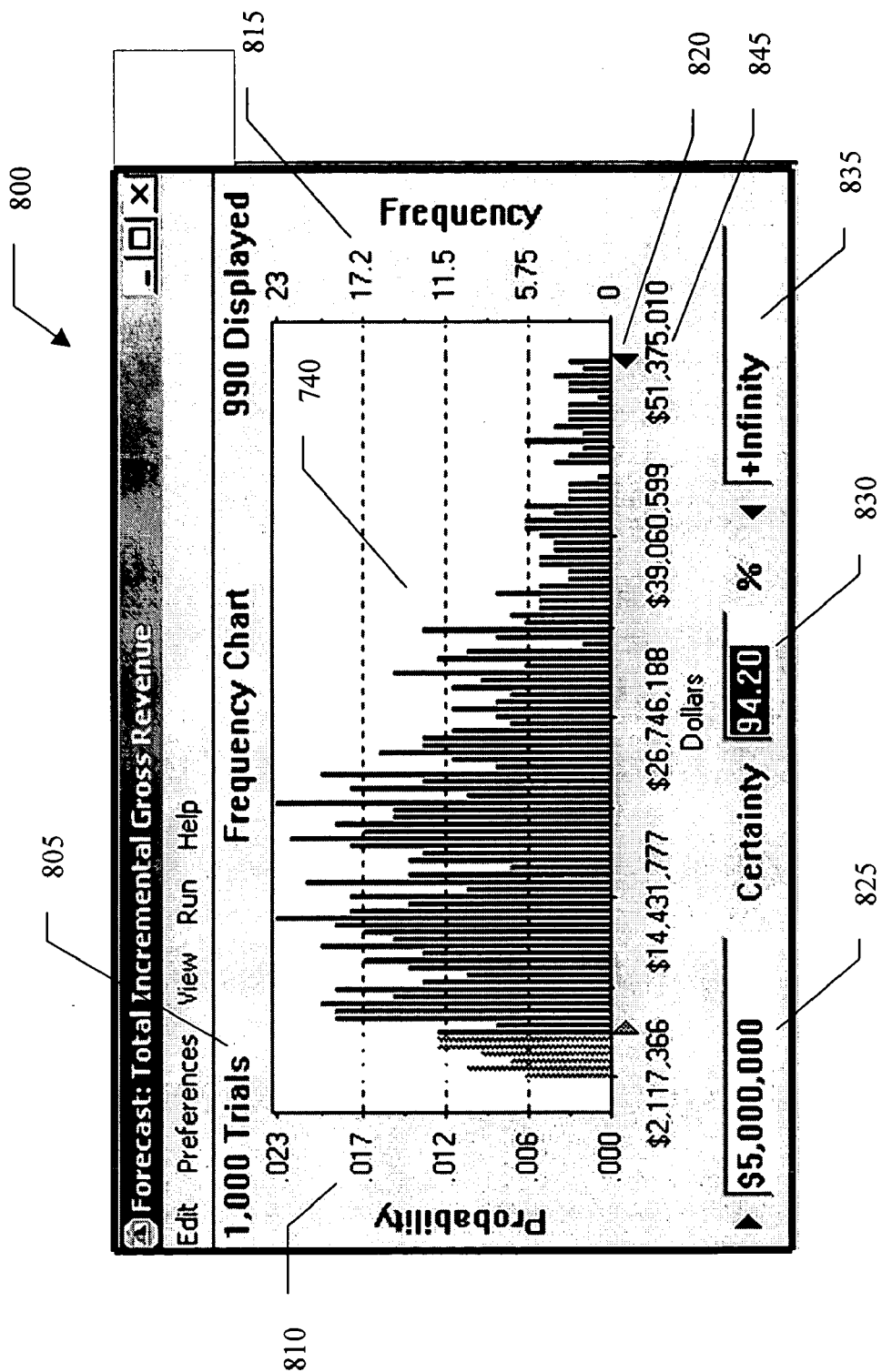
FIG. 8 is a diagram of a GUI for a probability analysis system.

FIG. 8 is an illustration of a user interface from a probability simulator that may be used for such probability analysis where a certain number of scenarios are generated in order to compute an average probability that a customer will, for example, move from one tier to the next tier in a brand pyramid. In FIG. 8, the simulator is shown simulating the total incremental gross revenue for a brand, but of course other simulators could be made. The simulator 800 shows a person the number of times that the simulator selected a random estimate of the assumptions. Thus, for the displayed chart 840, 1000 trials of random assumptions were calculated 805. The x-axis of the chart 840 shows the estimated revenue or value of the brand 845. The y-axis shows the probability that the revenue estimate will occur 810 and the number of times (i.e., the frequency) that the total revenue estimate occurred during the trials 815. The user may slide the two anchors 820 to restrict the range of results. The accuracy (i.e., the certainty) 830 of the simulation may be displayed to the user.

Assess Findings (Step 355 of FIG. 3)

Using the results of various simulations, the person may generate a series of findings to be presented to the brand owner 355. The findings may assist the brand owner to understand the impact various marketing changes may have on the brand's value or its perception by customers.

In one embodiment of the invention multiple types of analysis may be synthesized to better quantify brand development for the brand owner. For example, two, three or more of the following types of analysis activities may be performed and their results synthesized for a better picture of the brand value: building a tailored brand pyramid having a specialized number of tiers and specialized tier definitions; analyzing drivers of customer movement through the brand pyramid; calculating probabilities of success of driving customers through the pyramid; identifying development opportunities; performing probability simulations; prioritizing development opportunities; estimating an overall value for the brand; and performing regression analysis to determine the relationships between brand drivers and increments in price.

This assessment phase varies depending on the combination of analysis techniques chosen, as described above. The following table summaries some of the possible combinations and the type of assessment that may result from the combined analysis:

| Types of analysis combined | Possible assessment |
| --- | --- |
| brand pyramid conversion + image/equity analysis | understand the drivers behind why customers move from one tier of the brand pyramid to another tier, for determining how to increase attitudinal and behavioral loyalty |
| brand pyramid conversion + image/equity + tradeoff | understand the trade-offs between factors (i.e., drivers) causing a group of customers to move from one tier of the brand pyramid to another tier |
| brand pyramid conversion + econometric + image/equity | understand the relative weighting of drivers causing a group of customers to move from one tier of the brand pyramid to another tier |
| brand pyramid conversion + image/equity + probability | understand an estimate of the value based on a range of probabilities that a group of customers will move from one tier of the brand pyramid to another tier |

Pyramid clustering is another way to assess findings and to discover unique opportunities for brand development. In one embodiment of the invention, a certain set of pyramids may be created for a given variable or variables. For example, a brand pyramid may be created for each country where the brand is used. Or as another example, a brand pyramid may be built for each of a number of customer segments, industries, or products. The brand pyramids that make up the set may differ in respect to the number of tiers, the characteristics associated with the tiers, the size of the tiers, the relative proportion of the tiers to other tiers in the same pyramid, etc. A person may generate a series of archetype pyramids in the hopes of grouping all of the pyramids based on certain common characteristics into one of the archetypes. Initially, the archetypes are based on hypothesis. Once the person assigns each of the pyramids to an archetype, the archetypes' definitions may be refined and the pyramids redistributed among the archetypes. These steps may be repeated until the archetypes and their members are acceptable to the person. By successfully clustering the pyramids into the archetypes, the person may be able to offer a company assessments that differ among the archetypes. For example, image/equity analysis may be performed on each of the archetypes for generating insight about the preferred marketing techniques for the brand pyramids that are members of the different archetypes. Instead of image/equity analysis, the person may perform cluster analysis, factor analysis, decision tree analysis, or another type of statistical analysis.

As one example of creating archetypes and clustering the pyramids among them, suppose a company has data for customers from 64 countries. Rather than analyze and create a marketing plan for each of the 64 countries individually, the process of clustering the data into a certain number of archetypes may allow a marketing department to deploy a small number of marketing strategies. For example, by analyzing the comparative likeness of the 64 pyramids, six archetype clusters may be created through clustering. Six different marketing strategies may then be delivered to the company, based on the drivers for each archetype. For example, members of the first archetype may be marketing targeted in an attempt to raise awareness in the product. Members of the second archetype may be offered the product at a higher price, and members of the third archetype may have marketing targeted to them in order to increase the perception of quality.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims. For example, the analysis tool shown in FIG. 8 may be programmed to run on a general purpose Windows-based personal computer. Or the tool may be created on a Unix, Mac or other computer platform, for example. While the person's process is described above in four general steps, the process may be accomplished in a different number of steps, or in a different order. Other variations of the present invention are also possible.

We claim:

1. A method for quantifying brand development opportunities, comprising:
    executing instructions to perform computer-implemented steps on a processor,
        wherein the instructions comprise a first analysis tool module comprising a brand pyramid conversion analysis tool module, a second analysis tool module comprising an image/equity analysis tool module for determining tier-specific brand image factors that drive the population of customers to be associated with a selected tier of a selected multi-tier brand pyramid, and a regression analysis tool module; and
    wherein the instructions are configured to access at least one memory for data related to a population of customers in the selected tier and instructions; and
    wherein the instructions are embodied on a computer-readable medium; and
    wherein the executing comprises:
        executing a first analysis by the first analysis tool module to analyze a population of customers in a first tier of a multi-tier brand pyramid;
        executing a second tier-specific analysis of the first tier of the multi-tier brand pyramid by the second analysis tool module from the data related to the population of customers in the first tier of the multi-tier brand pyramid;
        determining, by the regression analysis tool module, the tier-specific brand loyalty or brand image factors related to the first tier and information about the tier-specific brand loyalty or brand image factors based on results of the first analysis and results of the second analysis;
        outputting a determined result on a display device, the determined result showing the tier-specific brand loyalty or brand image factors and the information about the tier-specific brand loyalty or brand image factors; and
        identifying and quantifying the tier-specific brand development opportunities based on the determined result, the tier-specific brand development opportunities comprising opportunities for increasing attitudinal and behavioral loyalty among the population of the customers associated with the first tier.

2. The method from claim 1,
    wherein the determining step identifies an association between the population of the customers in the first tier and the tier-specific brand image factors, and an extent that the tier-specific brand image factors drive customer movement from the first tier to a second tier of the brand pyramid and
    wherein the method further comprises
        outputting a display of an image perceptual map on the display device, the display of the image perceptual map showing an extent of and basis for brand differentiation based on the tier-specific brand image factors; and
        identifying and quantifying the tier-specific brand development opportunities based on the display of the image perceptual map.

3. The method from claim 1,
    wherein the method further comprises:
        executing a third analysis comprising a trade-off analysis by a trade-off analysis tool module; and
        wherein the determining step identifies trade-offs between factors causing a group of customers to move from the first tier to a second tier of the brand pyramid based on the results of the first analysis, the results of the second analysis, and results of the third analysis.

4. The method from claim 1, wherein the method further comprises:
    executing a third analysis comprising an analysis by an econometric analysis tool module; and
    wherein the determining step identifies a relative weighting of drivers causing a group of customers to move from the first tier to a second tier of the brand pyramid based on the results of the first analysis, the results of the second analysis, and results of the third analysis.

5. The method from claim 1, wherein the method further comprises:
executing a third analysis with a third analysis tool module;
wherein the third analysis tool module chosen is a probability simulator module;
wherein the third analysis further comprises generating, via a user interface, a selected number of scenarios involving moving from the first tier to a second tier of the brand pyramid and determining, based on the scenarios, a probability that a customer will move across the tiers;
wherein the determining step estimates a probability value based on a range of probabilities that a group of customers will move from the first tier to the second tier based on the results of the first analysis, the results of the second analysis, and results of the third analysis;
wherein outputting the determined results on the display device further comprises outputting a display of the estimated probability value and the range of probabilities that the group of customers will move from the first tier to the second tier; and
wherein identifying and quantifying the tier-specific brand development opportunities further comprises identifying and quantifying the tier-specific brand development opportunities based on the display of the estimated probability value and the range of probabilities that the group of customers will move from the first tier to the second tier.

6. The method from any one of claims 2 through 5, wherein the brand pyramid conversion analysis tool module performs brand pyramid conversion analysis on a multi-tier brand pyramid customized to a company and to an industry of the company.

7. The method from claim 4, further comprising
calculating a return on investment for at least one lever affecting revenue from a selected brand by a return-on-investment analysis tool module.

8. A method for quantifying brand development opportunities for a particular brand, comprising:
executing instructions to perform computer-implemented steps on a processor,
wherein the instructions comprise a customized brand pyramid analysis tool module and an image/equity analysis tool; and
wherein the instructions are configured to access at least one memory for data and instructions; and
wherein the executing comprises:
identifying, by the customized brand pyramid analysis tool module, a multi-tier brand pyramid customized to a company and to an industry of the company;
identifying customers who have converted from a first tier to a second tier of the multi-tier brand pyramid;
determining, by the image/equity analysis tool module and with data associated with the customers who have converted from the first tier to the second tier, the tier-specific brand image factors driving why the customers move from the first tier to the second tier;
outputting a display of an image perceptual map on a display device, the display of the image perceptual map showing an extent of and basis for brand differentiation based on the tier-specific brand image factors associated with the customers who have converted from the first tier to the second tier; and
quantifying tier-specific brand development opportunities associated with the tier-specific brand image factors based on the display of the image perceptual map.

9. The method from claim 8, further comprising:
evaluating, by a trade-off analysis tool module, trade-offs of customer needs causing a group of the customers to move from the first tier of the multi-tier brand pyramid to the second tier.

10. The method from claim 8, further comprising:
determining, by an econometric analysis tool module, a relative weighting associated with customer needs causing a group of the customers to move from the first tier of the multi-tier brand pyramid to the second tier over time.

11. The method from claim 8, further comprising:
determining, by a regression analysis tool module and based on customer perceptions and customer needs, the customer perceptions that drive the customer needs.

12. The method from claim 8, further comprising:
generating, via a user interface, a selected number of scenarios involving moving from a first tier of the brand pyramid to the second tier;
determining, by a probability simulator module and based on the scenarios, a probability that a customer will move across the tiers;
estimating, by the probability simulator module, a probability value based on a range of probabilities of customer needs causing a group of the customers to move from the first tier of the multi-tier brand pyramid to the second tier;
outputting, on the display device, a display of the estimated probability value and the range of probabilities of the customer needs causing the group of the customers to move from the first tier to the second tier; and
quantifying the tier-specific brand development opportunities for the particular brand based on the display of the estimated probability value and the range of probabilities of the customer needs causing the group of the customers to move from the first tier to the second tier.

13. The method from claim 8, further comprising:
generating, via a user interface, a selected number of scenarios involving moving from a first tier of the brand pyramid to a second tier;
determining, by a probability simulator module and based on the scenarios, a probability that a customer will move across the tiers;
estimating, by the probability simulator module, a probability value based on a range of probabilities of tier-specific image attributes driving conversion to the second tier;
outputting, on the display device, a display of the estimated value and the range of probabilities of the image attributes driving conversion to the second tier; and
quantifying the tier-specific brand development opportunities for the particular brand based on the display of the estimated value and the range of probabilities of the tier-specific image attributes driving conversion to the second tier.

14. A computer program product, comprising a computer usable medium having computer-readable program code embodied therein, said computer-readable program code adapted to be executed to implement a method for quantifying brand development opportunities, comprising:
executing instructions to perform computer-implemented steps on a processor,
wherein the instructions comprise a first analysis tool module comprising a brand pyramid conversion analysis tool module for analyzing a population of customers in a first tier of a multi-tier brand pyramid, a second analysis tool module comprising an image/equity analysis tool module for determining tier-specific brand image factors that drive the population of customers to be associated with the first tier, and a regression analysis tool module; and wherein the instructions are configured to access the at least one memory for data related to the population of customers in the first tier and instructions; and wherein the instructions are embodied on a computer-readable medium; and wherein the executing comprises:
- executing a first analysis by the first analysis tool module;
- executing a second tier-specific analysis by the second analysis tool module from the data related to the population of customers in the first tier;
- determining, by the regression analysis tool module, the tier-specific brand loyalty or brand image factors related to the first tier and information about the tier-specific brand loyalty or brand image factors based on results of the first analysis and results of the second analysis;
- outputting a determined result on a display device, the determined result showing the tier-specific brand loyalty or brand image factors and the information about the tier-specific brand loyalty or brand image factors; and
- identifying and quantifying the tier-specific brand development opportunities based on the determined result, the tier-specific brand development opportunities comprising opportunities for increasing attitudinal and behavioral loyalty among the population of the customers associated with the first tier.

15. The computer program product of claim 14,
wherein the determining step identifies an association between the population of the customers in the first tier and the tier-specific brand image factors, and an extent that the tier-specific brand image factors drive customer movement from the first tier to the second tier, for determining how to increase attitudinal and behavioral loyalty; and wherein the method further comprises
- outputting a display of an image perceptual map on the display device, the display of the image perceptual map showing an extent of and basis for brand differentiation based on the tier-specific brand image factors; and
- identifying and quantifying the tier-specific brand development opportunities based on the display of the image perceptual map.

16. A computer system for quantifying brand development opportunities, comprising:
- a processor;
- at least one memory storing data and instructions;
- a display device;
- a user interface; and
- distinct instruction modules embodied on a computer-readable medium;
  - wherein the distinct instruction modules comprise a first analysis tool module comprising a brand pyramid conversion analysis tool module configured to analyze a population of customers in a first tier of a multi-tier brand pyramid, a second analysis tool module comprising an image/equity analysis tool module configured to determine tier-specific brand image factors that drive the population of customers to be associated with the first tier, and a regression analysis tool module; and wherein the distinct instruction modules are configured to access the at least one memory for data related to the population of customers in the first tier and instructions and, when executing the instructions, to perform the computer-implemented steps on the processor of:
- executing a first analysis by the first analysis tool module;
- executing a tier-specific second analysis by the second analysis tool module from the data related to the population of customers in the first tier;
- determining, by the regression analysis tool module, the tier-specific brand loyalty or brand image factors related to the first tier and information about the tier-specific brand loyalty or brand image factors based on results of the first analysis and results of the second analysis;
- outputting a determined result on the display device, the determined result showing the tier-specific brand loyalty or brand image factors and the information about the tier-specific brand loyalty or brand image factors; and
- identifying and quantifying the tier-specific brand development opportunities based on the determined result, the tier-specific brand development opportunities comprising opportunities for increasing attitudinal and behavioral loyalty among the population of the customers associated with the first tier.

17. The computer system of claim 16, further comprising a probability simulator module configured to ;
- generate, via the user interface, a selected number of scenarios involving moving from the first tier to a second tier and determining, based on the scenarios, a probability that a customer will move across the tiers;
- wherein the determining step estimates a probability value based on a range of probabilities that a group of customers will move from the first tier to the second tier based on the results of the first analysis, the results of the second analysis, and results of the probability analysis;
- wherein outputting the determined result on the display device further comprises outputting a display of the estimated probability value and the range of probabilities that the group of customers will move from the first tier to the second tier; and
- wherein identifying and quantifying the tier-specific brand development opportunities further comprises identifying and quantifying the tier-specific brand development opportunities based on the display of the estimated probability value and the range of probabilities that the group of customers will move from the first tier to the second tier.

* * * * *